United States Patent Office 3,113,399
Patented Dec. 10, 1963

3,113,399
PROTECTED SEED
Russell A. Eversole, Excelsior, and Denny M. Roholt, Bloomington, Minn., assignors to Cargill, Incorporated, a corporation of Delaware
No Drawing. Filed Apr. 5, 1961, Ser. No. 100,800
5 Claims. (Cl. 47—1)

The present invention relates generally to the protection of seed by the application of coatings. More particularly, it relates to particular seed coatings and their methods of application.

It is known to coat seeds of many types for the protection of the seeds and to provide seeds having a large percentage which will germinate. The seeds need to be protected against disease, fungi and insects which can attack the seeds. In order to increase the germination rate, it is known to provide nutrients in the coating material.

The seed coating should be such that it will not lose its protective properties in the presence of water or moisture, but should be such that water can permeate the coating so as to effect a normal germination rate. Likewise, the coating should have hardness and brittleness properties such that the coated seed has high impact resistance and can withstand substantial pressures without fracturing while, at the same time, providing seed protection.

In order to facilitate the handling of the seed in the sowing, it is important that the coated seeds do not stick together. Moreover, while it is important to prevent the seeds from sticking together, it is also important that the coating adhere to the seed and spread evenly over the seed surface which may have waxy portions on the surface. In other words, the coating material should be capable of providing substantially uniform coating on waxy and non-waxy seed surfaces.

As before indicated, seeds have been coated with various coating materials and, from time to time, these materials have provided certain protection to the seeds, while other coatings have provided increased germination and higher germination rates to the seeds. However, we have not known a seed coating which provides protection to the seed under widely varying conditions of moisture, abrasion, and the like, and provides highest percentage of germination and/or improved germination rates.

Accordingly, it is a principal object of this invention to provide an improved coating for seeds and it is a more particular object of this invention to provide an improved seed coating under widely varying conditions.

It is a further object of this invention to provide seed coatings which will protect the seed under rough handling conditions, while providing higher percentage of germination and higher germination rates.

These and other objects and advantages of the invention will become apparent by reference to the following description.

The seed coating of this invention comprises a paint vehicle which is non-phytotoxic. The coating of this invention is substantially water insoluble so that it is not particularly weakened by moisture or water conditions. Thus, it can provide protection to the seed under high humidity conditions.

However, while the paint vehicle coating of this invention is water insoluble, it is important that it be permeable to water so as to permit normal germination of the seed. In order to permit this permeability the thickness of the paint vehicle on the seed should be between about 0.01 mil and 5.0 mils in thickness, and preferably, should be between about .5 mil and about 2.0 mils.

The seed coating of this invention is hard, but non-brittle in character so as to provide impact resistance to the seed and to permit the seed to withstand substantial abrasion and/or pressure during storage and handling. In this connection, the hardness and brittleness of the coating should protect against damage to the seed surface or rubbing off of the seed germ.

Of course, the coating should not be so tough as to prevent germination of the seed, but the forces developed in germination are so substantial that they will break a paint vehicle coating of the above indicated thickness without difficulty.

The hardness of the paint vehicle should be at least 3–B, when subjected to the "pencil hardness" test. This test is a standard test in the paint industry and is performed by applying a 1 mil thick film of the paint vehicle to a glass surface and air drying this film for 72 hours under ambient conditions. A Castell pencil having a point sharpened to a flat wedge is drawn perpendicular to the film surface with the flat side of the wedge transverse to the direction of draw. If the paint vehicle film has sufficient hardness that it will not rupture when a 3–B Castell pencil is drawn across it, it is sufficiently hard to provide a satisfactory seed coating for this invention. With such a hardness, we have found that the paint vehicle provides excellent protection to the seed surface.

As above indicated, the brittleness properties of the paint vehicle are also an important feature of the seed coating of this invention. In this connection, the paint vehicle should not crack when subjected to a mandrel test. The mandrel test is a standard test in the paint field and is disclosed in Gardner and Sward, Physical and Chemical Examination of Paints, Varnishes, Lacquers and Colors, 10th Edition, 1946, at page 171. In accordance with the mandrel test, a .001 inch thick film is applied to a 1/32 inch thick tin plate and dried for 72 hours. In order to pass the mandrel test, the film should not crack, after such drying, when the plate is bent 180 degrees over a 1/8 inch mandrel. For purposes of this disclosure, a paint vehicle passing this test is said to have a "positive mandrel test."

In order to provide the desired protection to the seed, the coating of this invention provides excellent impact resistance and the paint vehicle should pass an impact resistance test which involves applying a .001 inch thick film to a 1/32 inch thick tin plate and permitting the film to dry 72 hours. The film on this plate should not flake or crack when the plate is subjected on the non-film side to 30 inch-pounds impact by a Gardner impact hammer. For the purposes of this disclosure, the paint vehicle is said to have "positive impact resistance," when it does not crack when subjected to the indicated impact.

An important feature of the paint vehicle of this invention is its non-tacky character so that the seeds do not stick together and will readily flow through planting equipment. The coating of the invention provides a non-tacky coating for the seed and when the seed is placed in bushel bags and held for 72 hours, not more than about ten percent of the seed should adhere together. In the case of seed corn, not more than about five percent should remain on a 24/64 inch screen.

Coatings which have the desired hardness, non-brittleness and impact resistance in accordance with the foregoing tests will inherently have sufficient adherence to the seed surface. In this connection, the foregoing tests inherently indicate this feature of the coating.

As before pointed out, the coating should uniformly spread over the surface of the seed and, to this end, the coating may be dyed to determine whether the coating uniformly covers the seed. Generally, white areas or bare areas will show on the coated seed where the coating does not cover portions of the seed surface. If the coating does not have a compatibility with waxy surfaces, it will show through in the area of the waxy surface. It is, of course, important that the coating uniformly cover the seed surface.

We have discovered that paint vehicles can provide the best possible seed coatings, which vehicles have the desired water insolubility and yet provide water permeability. These paint vehicles can have desired hardness, non-brittleness, and spreadability over seed surfaces to provide maximum protection to the seed surface under high abrasion, impact and pressure.

In order to improve the germination properties of the seed, the paint vehicle may be blended with various nutrient materials or protective materials. In this connection, fertilizers or chemicals may be added to the seed coating to provide nutrients; and fungicides, or the like, may be added to provide protection against fungi. Of course, various coloring materials may be added to identify the seeds and this coloring may be in the form of dyes, pigments, or other coloring material.

Emulsifying agents may be used in the coating material to provide an emulsion of various added components but these components may also be dispersed by various dispersing means such as colloid mills, mixers, etc.

The paint vehicles which comprise coatings of this invention are selected from the class of vehicles comprising acrylic, alkyd, vinyl, oil modified polyurethane, chlorinated, ester, rosin, maleic, hydrocarbon, phenolic, and other similar resins. Of course, thermo-curing resins and resins containing phytotoxic compounds, such as tolylene di-isocyanate, phenol, anisole, phenoxyacetic acid, halophenols, nitrophenols, aminophenols, resorcinol, and like toxic materials, cannot be used.

Particular vehicles which can be used comprise maleic anhydride modified drying oil, vinyl acetate homopolymer emulsion, partially hydrolyzed co-polymer of vinyl chloride and vinyl acetate, drying oil modified polyurethane, vinyl toluene co-polymers drying oil, 23 percent penta soya oil alkyd, pinene polymer type hydrocarbon resin. These vehicles can provide the physical characteristics, above indicated, for protecting the seed and are compatible with seed surfaces.

In accordance with the method of the present invention, the paint vehicle is prepared and any added materials such as nutrients and fungicides are added along with emulsifiers, if desired. The mixture may be placed in a colloid mill or mixer to effect the desired blending of the ingredients. The paint vehicle is applied to the seed surface by spraying, dipping, brushing, rolling or other paint techniques and the vehicle may be more uniformly distributed upon the seed by tumbling, stirring, or mixing of the seed. As above pointed out, the coating should be uniformly distributed upon the seed surface to provide a coating of the indicated thickness, so as to permit permeation of the coating in the ground to effect germination of the seed, when planted.

The following examples will generally illustrate particular ways of practicing this invention:

*Example I*

A seed coating of this invention was prepared by mixing 5 grams of an epoxyester resin, sold under the trade name Epotuf 6406–60, with .4 gram of anthraquinone. This mixture was then added slowly to 90 grams of an aqueous solution containing 2 grams of a non-ionic polyether alcohol sold under the trade name Triton X–100 and .22 gram of Safranin O which is a dye. Agitation of the mixture was continued for one minute, whereupon it was terminated, leaving a reddish emulsion.

One pound of seed corn was spread out on a screen which was 15 inches wide and 24 inches long, the seed being spread at a thickness of one seed. Another screen of the same size was placed on top of the corn. The above prepared emulsion was painted onto the corn with a brush while it was held between two screens. Both sides of the corn were painted and about 35 grams of the mixture was painted through the screen to the first side of the corn and about 20 grams of the mixture was painted through the other screen onto the other side of the corn. There was substantially complete coverage of the seed with the coating material and no "fish eyes" or uncoated areas were noticed. The seeds were then poured on a long sheet of brown wrapping paper and were left at room temperature overnight to permit drying.

The seeds were not accepted by wild birds during field tests and had a high percentage of germination.

The seed coating was on the seed at a thickness of about 1.0 mil, and the coating passed the above indicated mandrel test and impact resistance test. The coating was insoluble in water and less than 5 percent of the seeds remained on a 24/64 inch screen, after being held in close association with one another.

*Example II*

Another seed coating of this invention was prepared by blending together 7.0 grams of a maleic anhydride modified oil, sold under the trade name Falkowood–51 with 81.0 grams of water, .34 gram of Rivanol dye to color the coating material, 2.0 grams of the non-ionic polyether alcohol sold under the trade name Triton X–100, and 9.1 grams of N-trichloro-methyl-mercapto 4-cyclohexene 1,2-dicarboxymide, sold under the trade name Captan. This mixture was blended together to make a colored emulsion and one-half pound of hybrid seed corn was placed in a one gallon paint can with 3.71 grams of the above mixture. The can was closed and placed on a mechanical paint roller. In the paint roller the can was tumbled for three minutes, whereupon the corn was dumped upon a sheet of brown paper. The coating was at a thickness of about .75 mil and covered substantially all of the surface of the corn.

On cold test, this corn was found to be 98 percent protected against fungi decay. The coating passed the mandrel test and the impact resistance test and after drying, was insoluble in water. It had a hardness greater than 3B under the pencil hardness test. The coating provided excellent protection for the seed.

*Example III*

Another seed coating of this invention was prepared by making an emulsion comprising 8.5 grams of 3-p-chlorophenyl, 1,1, dimethylurea, sold under the trade name CMU, .5 gram of a brilliant croceine, 3.0 grams of a polyvinylacetate, sold under the trade name 9301 Wallpol, 78 grams of water and 2.0 grams of a non-ionic alkyl aryl ether emulsifier, sold under the trade name Triton CF–10. The mixture was thoroughly agitated with a mechanical stirrer.

Two hundred grams of sorghum seed was placed in a screen basket and the seeds were dipped into the above mixture and held for one-quarter minute. The basket was raised from the container and the seeds allowed to drain, whereupon they were transferred on to brown paper and spread out in a single layer. The seeds were allowed to dry by sunlight. Clumps of seed, which developed because of this method of coating, were broken apart with a mortar and pestle. Considerably less weed growth occurred in a plot planted with these seeds than in a control plot.

The coating was insoluble in water, after drying, and passed the impact resistance test and the mandrel test. After the seeds were broken apart, there was no substantial sticking together of the seeds.

*Example IV*

A seed coating was prepared with nutrient material in the coating, the coating comprising 10 milliliters of a dense actively growing culture of nitrogen fixing bacteria, 6 grams of a styrene-butadiene co-polymer sold under the trade name Latex 762-K, and 184 milliliters of water. Twenty grams of this mixture were mixed with one pound of soy beans in a gallon can which was tumbled for 3½ minutes. After tumbling, the seeds were spread on a sheet of paper to air dry. The coating had a thickness of about 1.5 mils and passed the mandrel and impact resistance tests. After drying, there was no substantial sticking and the soy beans were uniformly covered.

Example V

A seed coating was prepared by mixing .5 gram of a partially hydrolyzed co-polymer of vinyl chloride and vinyl acetate, sold under the trade name "Vinylite Resin" VAGH, 10 grams of lacquer solvent, 84.1 grams of water, 1.5 grams of the non-ionic polyether alcohol known as Triton X-100, 7.3 grams of sodium succinate, .48 gram of croceine orange Y, 1.5 grams of a block polymer surfactant having the formula:

$$HO(C_2H_4O)_a(C_3H_6O)_b(C_2H_4O)_cH$$

and .105 gram of 3-(α-acetonylbenzyl) 4-hydroxycoumarin which is sold under the trade name Warfarin.

Example VI

Another seed coating of the invention providing improved germination of the seed was prepared by making a mixture of .275 gram of resorcin brown, .025 gram of 3-indole-butyric acid, 18 grams of phenolic resin modified drying oil, 89 milliliters of water and 2 grams of a surface active agent of the aryl polyethoxy ethanol type. The phenolic resin modified drying oil was a 25 gallon oil length, China-wood oil varnish having 50 percent solids in mineral spirits. The mixture was blended together to make a slurry and 20 grams of seed grade corn was agitated in this slurry for one-half minute, whereupon the slurry was drained from the seed by pouring the seed onto a 20 mesh screen. The screen was vibrated vigorously to remove excess amounts of the coating material, and the seed was spread out to dry.

This seed coating caused the seed to sprout seven hours sooner than an untreated control.

Example VII

An additional seed coating of this invention was prepared by taking .02 gram of chlorobenzilate and mixing it with 1.25 grams of 23 percent penta soya oil, alkyd resin sold under the trade name BB-6-60. This mixture was then emulsified with 100 milliliters of water, containing 2 grams of the non-ionic polyether alcohol known as Triton X-100. 1.325 grams of manganese acetate hydrate and .03 gram of resorcin brown were dissolved and .5 gram of a nutrient fatty amide was blended into the mixture with vigorous agitation being continued for 1 minute.

Five grams of the above coating were applied to 38 grams of hybrid seed corn in a wire basket. The basket was then hung in a duct in front of a fan circulating air at about 3,000 to 4,000 cubic feet per minute at a temperature between about 225° F. and 260° F. The seeds were dried for 2½ minutes and had excellent protection against damage by insects and mites.

Example VIII

A still further seed coating was prepared by taking 7½ grams of a pinene polymer hydrocarbon resin, sold under the trade name Piccolyte S-115, and cold cutting it with 67.5 grams of mineral spirits, the cut resin being then emulsified in 75 grams of water containing 1.75 grams of a non-ionic polyether alcohol. To this mixture was added .14 gram of sunset yellow and 1.7 grams of p-dimethylamino-benzenediazo sodium sulfonate having the formula

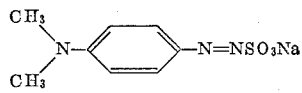

The mixture was continuously agitated and 9 grams of the agitated mixture were blended with 85 grams of sorghum seed. The seed was drained and dried, and broken up. In cold tests the coated seed had twice the resistance to fungicidal damage as untreated control seeds.

Example IX

A further coating was prepared by emulsifying in 100 milliliters of water containing 2.0 grams of a non-ionic polyether alcohol, 3 grams of an oil modified polyurethane resin sold with the designation 1459. To this emulsion was added .040 gram of malathion and .2 gram of wool orange "A."

Thirty-eight grams of this coating material were thoroughly mixed with 1 pound of seed corn in a wire basket and the basket was placed in a hot air duct for 10 minutes to effect drying. The air was about 205° F. and circulated at 3300 cubic feet per minute. The coated seed had excellent resistance to insects.

Example X

A further seed coating of this invention was prepared by taking a mixture of 50.0 grams mineral spirits, 35 grams of refined linseed oil, 15.0 grams of pine wood rosin, and .3 gram of 24 percent lead naphthenate and 6 percent cobalt naphthenate solution. This mixture was emulsified with 38 grams of water containing 1.0 gram of Rhodamine "B," which is 3-ethochloride of 9-O-carboxyphenyl-6-diethylamino-3-ethylimino - 3 - isoxanthene, and 18.0 grams of an aryl ethoxy ethanol surface active agent. To the emulsion, while being agitated, was added 53 grams of a fungicide supplied under the designation 3944.

One hundred and fifty grams of this mixture was added to five pounds of hybrid seed corn in a revolving drum which was rolled for two minutes. The coated seeds were then spread on paper and then were allowed to completely air dry.

On cold test, this coated corn had 96.5 percent protection against fungus deterioration.

Example XI

Another coating of the invention was prepared by taking 5 grams of a vinyl toluene copolymer modified drying oil, sold under the trade name Keltrol 1001, and slowly mixing this with 90.0 grams of a rapidly agitated aqueous solution containing 2.0 grams of a non-ionic polyether alcohol surfactant, .3 gram of orange "G" and 4.5 grams of ammonium nitrate. After addition of the drying oil, agitation was continued for one minute.

One pound of seed corn was spread between screens and 35 grams of the coating was spread on both sides of the seed with a paint sprayer. The seeds were released from between the screens and were allowed to dry in shallow pans.

The treated seeds were planted in nitrogen-deficient soil and plants emerged in about four days and were growing well when they were one foot high. Untreated seeds, on the other hand, did not emerge until the seventh day and the plants grew poorly thereafter.

Example XII

Another coating of the present invention was prepared by dissolving 5 grams of a chlorinated resin having a viscosity of 5 centipoises, this resin being sold as Stabilized Parlon, in 10 grams of toluene. This mixture was emulsified with 83 milliliters of water, .2 gram of organge "G" and 2 grams of the non-ionic polyether alcohol surfactant, Triton X-100. The resulting emulsion was moderately agitated while 5.36 grams of tetramethylthiuram disulphide was added to make a slurry.

Ten grams of the slurry was coated on to one pound of seed corn in a gallon paint can, the can being tumbled for about two minutes to obtain uniform distribution of the coating. The seed was then spread to dry.

Cold tests on this treated corn showed great resistance to fungal decomposition.

Example XIII

Another seed coating was prepared by dissolving in 83.8 milliliters of water 8 grams of a water soluble esterified maleic adduct, sold under the designation 750, .01 gram of hydrated manganese acetate and 4 grams of fumaric acid. This solution was moderately agitated and 6.2 grams of p-dimethylaminobenzenediazo sodium sulfonate was added to provide a slurry. 4.3 grams of this slurry was added to one-half pound of seed corn having a low germination rate, as a result of several years of storage. The coated seed was then spread out on a large sheet of paper for drying.

The coated seed corn of this example was resistant to soil decay, when planted in the spring under mild weather conditions and 19.2 percent more seed germinated than did the control seed.

Example XIV

As a further example of the coating of this invention, 37 grams of an acrylic resin sold under the designation 2647, 1 gram of a block polymer type surfactant having the general formula:

sold under the trade name Pluronic F-68, 7.5 grams of N-trichloro-methyl-mercapto 4-cyclohexene 1,2-dicarboxymide, 15 grams of O,O-dimethyl-S-(1,2-dicarboxyethyl) dithio phosphate, .215 gram of resorcin brown, .16 gram of crocein orange and 62 grams of water were blended together to form a homogeneous mixture and were continuously agitated. Two hundred grams of hybrid sorghum seed were mixed thoroughly with 7.42 grams of the above mixture and the seed spread to dry.

The coated seeds resisted infestation during storage and had 87.4 percent germination when planted very early in the spring in cold wet soil, as compared to a normal expectancy of less than about 50 percent germination.

Each of the coatings in the foregoing examples was water insoluble, after drying on the seed, and had a pencil hardness in excess of 3–B. Furthermore, each of the coatings passed the mandrel test and the impact resistance test, above mentioned. The coatings, while varying in thickness, all had a thickness of between about .5 mil and about 2.0 mils, so that they gave the desired water permeation for germination. In each of the examples, the coatings were compatible with the seed surfaces and gave substantially uniform coating without the formation of "fish eyes" or uncoated areas upon the seed surfaces. The coated seeds had a desirable surface slipperiness which permitted them to be planted by mechanical farm equipment.

In the case of each of the foregoing examples, the coated seeds when placed in bushel bags and allowed to stand for extended periods, do not stick together, once the coating material is dried, and, in all cases, less than 10 percent of the seeds stick together.

Sufficient examples have been set forth in the foregoing to permit one skilled in the art to practice the teachings of this invention, but it is well understood among those skilled in the art that precise formulations of many of the resins herein indicated cannot be obtained from the manufacturers and cannot be determined by known chemical analysis techniques. Nevertheless, with the teachings of this disclosure and of the specific examples, one skilled in the art can provide a paint vehicle which will have the indicated physical properties to provide protection for seeds. Thus, our particular discovery is the use of particular paint vehicles, as described herein, on seeds to effect improved protection for the seed and to permit handling of the seed with expedition in mechanical equipment. Of course, as above indicated, the coating is compatible with various additive materials which enhance the protection and properties of the seed.

Various features of this invention which are believed to be new are set forth in the following claims.

What is claimed is:

1. A coated seed having a coating comprising a non-phytotoxic paint vehicle which, upon drying, is insoluble in water, said coating having positive impact resistance, having at least a 3–B pencil hardness, and having a positive mandrel test, said coating having a thickness of between about 0.01 mil and about 5.0 mils to permit moisture permeation of the seed.

2. A coated seed having a coating comprising a non-phytotoxic paint vehicle which, upon drying, is insoluble in water, said coating having positive impact resistance, having at least a 3–B pencil hardness, and having a positive mandrel test, said coating having a thickness of between about .5 mil and about 2.0 mils to permit moisture permeation of the seed.

3. A coated seed, the seed having a waxy surface and having a coating comprising a non-phytotoxic paint vehicle which, upon drying, is insoluble in water, said coating having positive impact resistance, having at least a 3–B pencil hardness, and having a positive mandrel test, said coating having a thickness of between about .5 mil and about 2.0 mils to permit moisture permeation of the seed, and said coating being uniformly distributed over the waxy surface of said seed.

4. A coated seed having a coating comprising a non-phytotoxic paint vehicle which, upon drying, is insoluble in water, said coating having positive impact resistance, having at least a 3–B pencil hardness, and having a positive mandrel test, said coating having a thickness of between about 0.01 mil and about 5.0 mils, and said coating being non-tacky under pressure.

5. A coated seed having a coating comprising a non-phytotoxic paint vehicle which, upon drying, is insoluble in water, said paint vehicle being selected from the group consisting of acrylic resins, alkyd resins, polyester resins, hydrocarbon resins, maleic acid resins, oil modified polyurethane resins, phenolic resins, vinyl copolymer resins and chlorinated resins, said coating having positive impact resistance, having at least a 3–B pencil hardness, and having a positive mandrel test, said coating having a thickness of between about 0.01 mil and about 5 mils to permit moisture permeation of the seed.

References Cited in the file of this patent

UNITED STATES PATENTS

| 2,083,065 | Heyl | June 8, 1937 |
| 2,648,165 | Nestor | Aug. 11, 1953 |
| 2,651,883 | Hedrick | Sept. 15, 1953 |
| 2,736,139 | Wise | Feb. 28, 1956 |
| 2,986,840 | Rogers | June 6, 1961 |

FOREIGN PATENTS

| 411,040 | Germany | Mar. 24, 1925 |